(12) United States Patent
Supak et al.

(10) Patent No.: US 8,819,082 B2
(45) Date of Patent: Aug. 26, 2014

(54) METHOD FOR VISUALIZING RESOURCE RELATIONSHIPS STORED IN SQL TABLES WITHIN A MAINFRAME ENVIRONMENT

(75) Inventors: Michal Supak, Trencin (SK); Petr Weinfurt, Pizen (CZ); Mark Rodmell, Middlesex (GB)

(73) Assignee: CA, Inc., Islandia, NY (US)

( * ) Notice: Subject to any disclaimer, the term of this patent is extended or adjusted under 35 U.S.C. 154(b) by 455 days.

(21) Appl. No.: 12/786,604

(22) Filed: May 25, 2010

(65) Prior Publication Data

US 2011/0295872 A1  Dec. 1, 2011

(51) Int. Cl.
*G06F 17/30* (2006.01)
*G06F 7/00* (2006.01)

(52) U.S. Cl.
USPC .......................................... 707/804

(58) Field of Classification Search
USPC .......................................... 707/804
See application file for complete search history.

(56) References Cited

U.S. PATENT DOCUMENTS

2005/0278440 A1* 12/2005 Scoggins ...................... 709/223
2007/0260582 A1* 11/2007 Liang ............................... 707/2
2010/0319060 A1* 12/2010 Aiken et al. ..................... 726/7
2010/0332475 A1* 12/2010 Birdwell et al. ............. 707/737

OTHER PUBLICATIONS

Mao, "DBViewer: A Tool for Visualizing and Measuring Dependency Relations between Tables in Database", May 2009, IEEE.*

* cited by examiner

*Primary Examiner* — Jeffrey A Burke
(74) *Attorney, Agent, or Firm* — Myers Bigel Sibley & Sajovec, P.A.

(57) ABSTRACT

A system and method is provided for visualizing system resource relationships in a mainframe environment. The resource relationships may be presented in a single, logically constructed diagram/graph regardless of the number of subsystems or database tables in the mainframe environment.

18 Claims, 2 Drawing Sheets

METHOD FOR VISUALIZING RESOURCE RELATIONSHIPS STORED IN SQL TABLES WITHIN A MAINFRAME ENVIRONMENT

TECHNICAL FIELD

The invention relates to the field of mainframe management systems and products. More particularly, the invention relates to managing resource relationships for mainframe management systems and products.

BACKGROUND

System resources often have complex relationships with each other. Generally, in order to understand resource relationships and dependencies, users are expected to examine database tables that store such information. This proves to be a cumbersome task, particularly in text-based mainframe environments where graphical illustrations of the resource relationships and dependencies are not used. As such, a quick, effective and user-friendly way of allowing users to examine resource relationships in a mainframe environment is needed.

These and other drawbacks exist.

SUMMARY

In some implementations, the invention relates to a system and method for visualizing system resource relationships in a mainframe environment. The resource relationships may be presented in a single, logically constructed diagram/graph regardless of the number of sub-systems or database tables in the mainframe environment.

In response to a request to visualize one or more system resource relationships, appropriate tables that store the relationship information may be created or extracted, a text file that describes the structure of the created/extracted tables in a graph description language (e.g., DOT language) may be generated, and the generated text file may be transferred to a personal computer (PC) via FTP (file transfer protocol), wherein the PC is configured to run a graph visualization software that is capable of processing the transferred text file and displaying graphical representation(s) of the created/extracted table.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
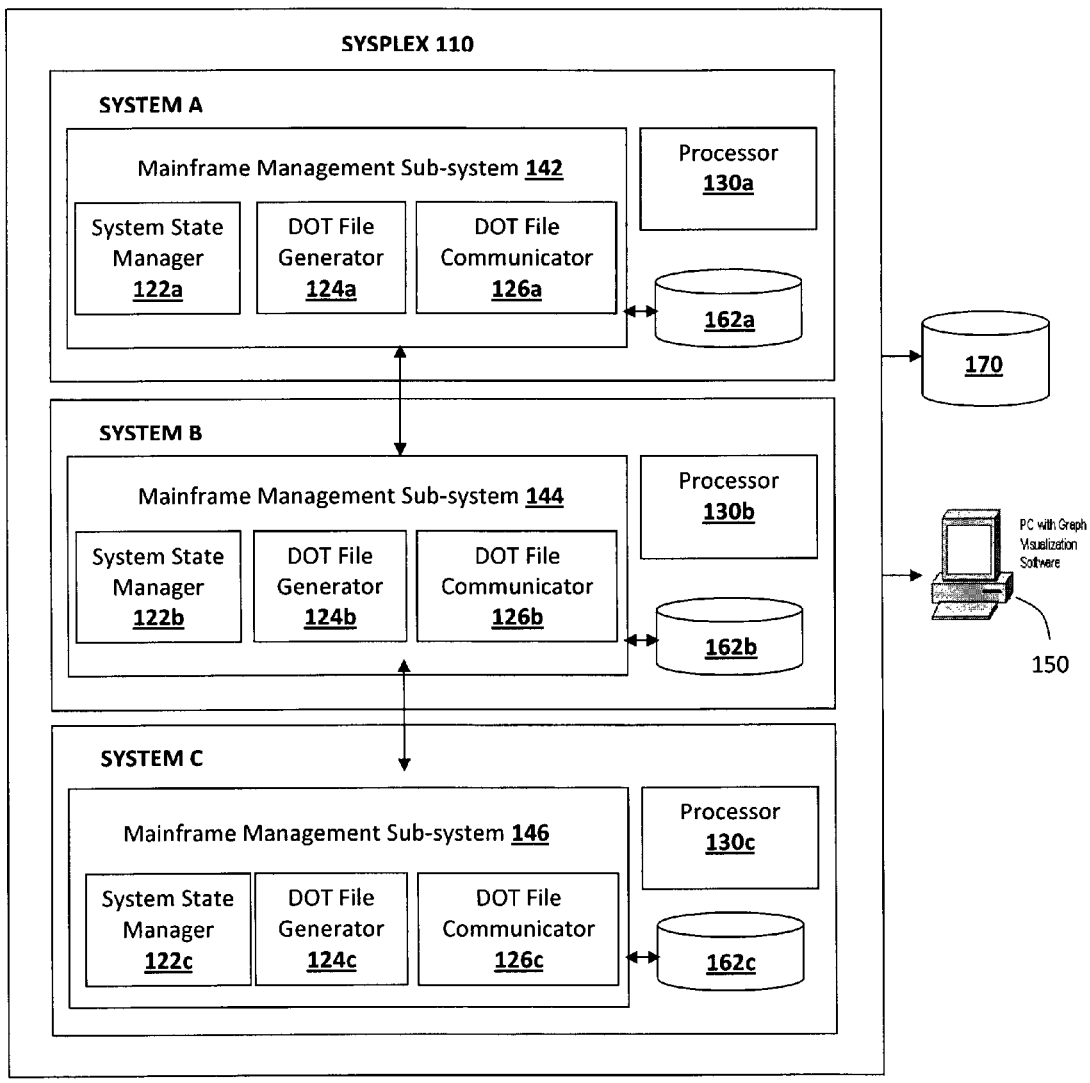
FIG. 1 illustrates an exemplary mainframe management system, according to various aspects of the invention.

FIG. 1 is an exemplary illustration of a mainframe management system 100, according to an aspect of the invention.

Mainframe management system 100 may include, among other things, a systems complex 110 (SYSPLEX) comprising one or more systems (for example, system A, system B, system C, etc.). System A comprises mainframe management sub-system 142 that is configured to manage system resources associated with sub-system 142 and relationships between the corresponding resources. System B comprises mainframe management sub-system 144 that is configured to manage system resources associated with sub-system 144 and relationships between the corresponding resources. System C comprises mainframe management sub-system 146 that is configured to manage system resources associated with sub-system 146 and relationships between the corresponding resources. System resources (associated with each sub-system) may include, but not be limited to, relational database tables (e.g., SQL or other tables), batch jobs, devices (for example, enterprise printers, and/or other devices), hook jobs, shared tasks (STCs), and/or other system resources. Any entity that has a definable start action and a definable stop action and that can be managed by a mainframe management sub-system may be referred to as a system resource. It will be understood that the invention is not limited to the system resources included in the list above, and may include any type or number of system resources without departing from the spirit of the invention.

System A, system B and system C may be LPARS (logical partitions) residing on the same hardware in the same SYSPLEX 110. The processors 130a, 130b, 130c may be virtual representations of the actual hardware as visible to each LPAR. While FIG. 1 depicts three sub-systems 142, 144, 146, it should be understood that the invention is not limited by the number of sub-systems, and any number of sub-systems may be utilized without departing from the spirit of the invention. Each sub-system 142, 144, 146 may include or be communicatively coupled to one or more relational databases 162a, 162b, 162c that include information associated with one or more system resources associated with the sub-system. Relational database 162a coupled to sub-system 142, for example, may include one or more tables (for example, SQL or other tables) that may store information concerning each system resource associated with sub-system 142. The information concerning each system resource may include, but not be limited to, desired state, current state, pre-requisites, relationships/dependencies with other system resources in sub-system 142 or other sub-systems 144, 146, originating system, missing pre-requisite list, alternate system list, desired system, current system, and/or other information. A record in a particular table may contain information for a single system resource. Relational databases 162b and 162c may similarly include one or more tables that may store similar information concerning each system resource associated with sub-systems 144 and 146, respectively.

In one implementation, mainframe management system 100/SYSPLEX 110 may be communicatively coupled to a global relational database 170 which may include a global resource table that stores information associated with all system resources associated with all sub-systems in SYSPLEX 110. The information concerning each system resource in the global resource table 170 may include, but not be limited to, desired state, current state, pre-requisites, relationships/dependencies with other system resources in the system, originating system, missing pre-requisite list, alternate system list, desired system, current system, and/or other information. A record in a particular table may contain information for a single system resource.

Each system (system A, system B, system C) may include a processor 130a, 130b, 130c, (respectively), circuitry and/or other hardware operable to execute computer-readable instructions. According to one aspect of the invention, mainframe management system 100 may include one or more tangible computer-readable storage media configured to store one or more software modules, wherein the software modules include computer-readable instructions that when executed by the processor cause the processor to perform the functions described herein. According to one implementation, each sub-system (142, 144, and 146) may comprise computer hardware programmed with a computer application having one or more software modules that enable the various features and functions of the invention. Non-limiting examples of the software modules in the application may include one or more of a system state manager (122*a*, 122*b*, 122*c*), a DOT file generator (124*a*, 124*b*, 124*c*), a DOT file communicator (126*a*, 126*b*, 126*c*), and/or other modules for performing the features and functions described herein. In some implementations, each sub-system 142, 144, 146 may have its own system state manager (122*a*, 122*b*, 122*c*, respectively) running that may manage system resources native to that sub-system. In some implementations, the sub-systems 142, 144, 146 may be interconnected, thereby making it possible to run DOT file generator and DOT file communicator on any one of these sub-systems.

System administrators (or other users) may interact with the mainframe management system 100 via one or more client devices (not shown). The client devices may each comprise a user interface (not shown) that may enable users to perform various operations that may facilitate interaction with mainframe management system 100 including, for example, providing requests to visualize resource relationships, providing file generation and transfer settings, defining task dependencies and/or system resource relationships, and/or performing other operations. The client devices may include a processor (not shown), circuitry, and/or other hardware operable to execute computer-readable instructions.

While the features and functionality associated with various aspects of the invention are described herein with respect to system A, sub-system 142, and components/modules of system A/sub-system 142, it will be understood that the description applies to the other systems/sub-systems in the mainframe management system 100 as well, without departing from the scope of the invention.

According to one implementation, system state manager 122*a* may enable users to manage the operation of system resources associated with sub-system 142. Tasks may represent the operations performed with system resources. For example, a startup task may represent a start operation which comprises issuing a start command to a particular system resource. Other tasks and operations may be performed without departing from the scope of the invention. Tasks may be dependent on one another, for example, a task associated a particular system resource may need to be performed before, after, or simultaneously with a task associated with another system resource. In one implementation, system resources associated with the tasks may need to be started or shut down in a pre-defined order or sequence. A particular system resource (associated with a particular sub-system) or operation/task associated with the particular system resource may be a pre-requisite for another system resource (associated with the same sub-system or other sub-system) or operation/task associated with the other system resource. In other words, system resources associated with the tasks may have relationships with one another.

For example, system resources may have relationships such as, but not limited to, startup and shutdown sequences/relationships (and/or other processes among system resources). In a particular example, a user may execute a number of enterprise extender (EE) programs on their system. During startup, a first process, such as a Virtual Telecommunications Access Method (VTAM) process, may be initiated at a first time. A second process, such as a NETVIEW process, may be executed at a second time after the first time. When the first process and the second process are executed, one or more EE-related tasks may be performed. During shutdown, the first process, the second process, and the EE-related tasks should be shutdown in the same order of the startup. However, during shutdown, the second process and the EE-related tasks may be stopped in any order and may not be restricted to the same startup sequence. Thus, the user causing the shutdown should be able to view the resource relationships (e.g., the startup sequence/relationships in the foregoing non-limiting example) in order to perform the shutdown in an appropriate manner.

In some implementations, the task dependencies and/or resource relationships may be defined across multiple database tables 162*a*, 162*b*, 162*c* associated with multiple sub-systems 142, 144, 146.

System state manager 122*a* may receive a user request (or other system request) to visualize resource relationships in mainframe management system 100. The request may include, among other things, a group system name, a list of database tables, or one or more system resources, for which resource relationships are to be visualized. A group of sub-systems may be given a name, for example, sub-systems 142, and 144, may form a group and may be given a particular group system name. The request may include this group system name which identifies the sub-systems from which resource relationship information is to be retrieved. Similarly, a list of tables included in the request may identify the databases/tables associated with the sub-systems from which resource relationship information is to be retrieved. In one implementation, the request may include one or more system resources for which resource relationship information is to be visualized.

In one implementation, in response to a request that includes a group system name (identifying sub-systems 142 and 144, for example), system state manager 122*a* may create a composite table by retrieving and/or combining database tables associated with databases 162*a* and 162*b*, wherein the composite table may include, among other things, system resource relationship information associated with sub-systems 142 and 144. In one implementation, in response to a request that includes/identifies a particular system resource, system state manager 122*a* may create a composite table by retrieving resource relationship information associated with the particular system resource from databases 162*a*, 162*b*, 162*c* (i.e. database tables of databases 162*a*, 162*b*, 162*c*) associated with sub-systems 142, 144, 146. In other words, system state manager 122*a* goes through the sub-systems, retrieves resource relationship information associated with the particular system resource from database tables associated with each sub-system, and creates a composite table which combines the resource relationship information across multiple sub-systems and multiple database tables.

In one implementation, all the sub-systems in the mainframe management system 100 may form a group and may be given a different group system name. As such, a request which includes this group system name may indicate that all resource relationships across all sub-systems are to be visualized. In this case, system state manager 122*a* may extract a global resource table from global resource database 170.

In one implementation, the request may not identify or include group system names, lists of tables, or system resources. In response to the request, system state manager 122a may, by default, extract the global resource table from global resource database 170.

Once the composite table has been created or the global resource table has been extracted, system state manager 122a may provide the created/extracted table to DOT file generator 124a. DOT file generator 124a may generate a text file written in a graph description language, which describes the structure of the created/extracted table. The graph description language may include instructions that when executed cause a graphical representation to be generated. In some implementations, the text file may describe the system resource relationships associated with the created/extracted table using instructions that format or otherwise cause a graphical representation to be generated. For example, the graph description language may include instructions for drawing a line between two graphical object shapes, where the line represents an edge between two nodes represented by the two graphical object shapes. In these implementations, for example, a relationship between two system resources may be defined in the text file as an edge between two nodes so that the two resources are depicted as two graphical object shapes joined by a line. As would be appreciated, the graph description language may include other instructions for generating graphical representations, such as coordinate-based (e.g., a bitmap) instructions, vector-based instructions (e.g., Scalable Vector Graphics), and/or other instructions that may be written in the text file and cause graphical representations to be generated.

In some implementations, the graph description language uses DOT notation language. In these implementations, the text file includes a DOT file that describes the system resources and the relationships between the resources. DOT file generator 124a may be implemented using REXX (REstructured eXtended eXecutor) language, wherein records from the created/extracted table are stored into REXX variables. A record may contain information (among other things, resource relationship information) associated with a single system resource. Using field values for each record in the created/extracted table and the syntax of a graph description language (for example, DOT language), a DOT file may be generated by DOT file generator 124a. The syntax of the graph description language may be stored in a temporary storage location in system A/sub-system 142 during the running of DOT file generator 124a. In some implementations, a data structure in random access storage (i.e., program stack) may be utilized to construct the DOT file during the life of the DOT file generator program. It will be understood that while implementation of DOT file generator has been described using REXX language, any other programming language can be used without departing from the scope of the invention. Also, while the invention is described in terms of DOT language as a graph description language, any other graph description language may be used to generate a text file that describes the structure of the created/extracted table, without departing from the scope of the invention.

In one implementation, once the DOT file has been generated from the created/extracted table's records, DOT file communicator 126a may transfer the generated DOT file from system A/mainframe management sub-system 142 to a remotely located personal computer (PC) 150 or any desktop or other computer that is configured to run a graph visualization software that is capable of processing DOT files and displaying graphical representation(s) of the created/extracted table. In one implementation, the graph visualization software may display a DOT file as a directed graph/diagram that graphically displays system resource relationships across multiple sub-systems and/or database tables. Examples of graph visualization software may include, but not be limited to, Graphviz, Doxygen, and/or other graph visualization software without departing from the scope of the invention.

DOT file communicator 126a may transfer the DOT file to PC 150 via FTP (File Transfer Protocol). DOT file communicator 126a may, based on FTP hostname (for example, domain address or IP address of PC 150), username and password (on PC 150), connect to PC 150 and transfer the DOT file to PC 150. In one implementation, DOT file communicator 126 may be implemented using REXX language, wherein the FTP hostname, username and password are stored into REXX variables. It will be understood that while implementation of DOT file communicator has been described using REXX language, any other programming language can be used without departing from the scope of the invention. Also, while the invention is described in terms of communicating/transferring a DOT file to PC 150, it will be understood that a text file generated using any other graph description language may also be communicated from system A/mainframe management sub-system 142 to PC 150, without departing from the scope of the invention.

PC 150 may receive the transferred DOT file in a temporary PC folder. In one implementation, a user may setup and start a FTP server on PC 150. The user may create a profile on PC 150 with a specific username and password that matches the username and password used by the DOT file communicator 126a. The user may set various FTP server settings/options, for example, anonymous access, no password requirement, folder for receiving transferred DOT file, transfer settings, and/or other options/settings. As such, the DOT file (or other generated text file) transfer may occur in accordance with the settings/options, wherein these settings/options are also programmed in the DOT file communicator.

PC 150 may run graph visualization software, for example, Graphviz, which processes the transferred DOT file and converts it into a graphical representation of the composite or global resource table. PC 150 may implement a graph viewer/renderer, for example, a SVG-based zooming graph viewer such as ZGRViewer, in order to use features, such as zoom, with the graphical representation. The user may set various graph visualization software settings/options, for example, set a temp directory, set DOT files directory, set DOT executables (e.g., /usr/local/graphviz-2.14/bin/dot), set Neato executables (e.g., /usr/local/graphviz-2.14/bin/neato), and/or other options/settings. The graph visualization software and/or viewer may display a graph of system resource relationships which the user is able to interact with, for example, zoom into, select, etc. The graph visualization software and/or viewer may enable a user to view the connectivity between system resources and the relationships between the system resources.

Figure 2:
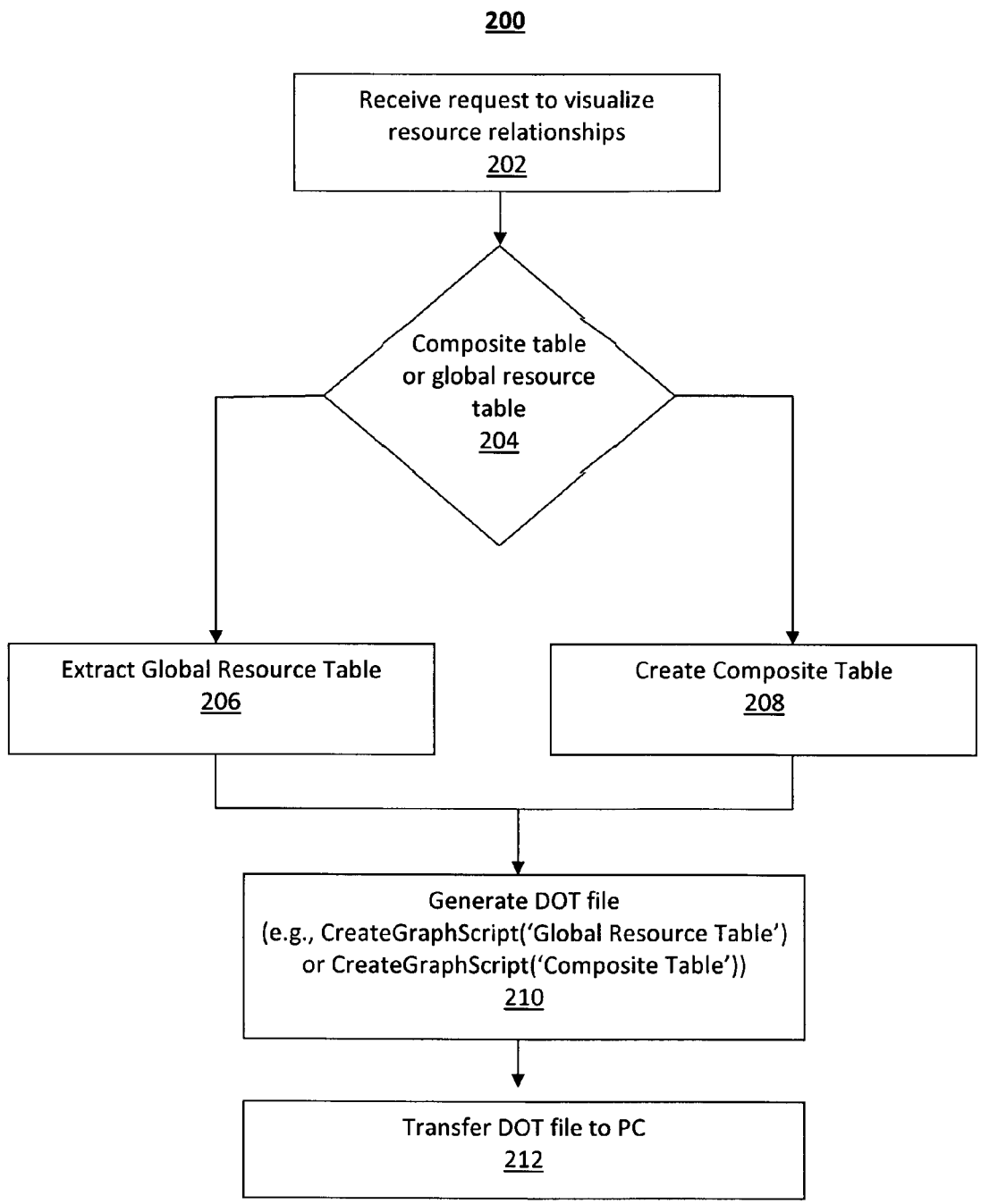
FIG. 2 illustrates a flowchart depicting example operations performed by a mainframe management system, according to various aspects of the invention.

FIG. 2 is a flowchart 200 depicting example operations performed by a mainframe management system 100 to visualize resource relationships, according to various aspects of the invention. In some implementations, the example operations may be performed by one or more components/modules of the mainframe management system 100. In some implementations, various operations may be performed in different sequences. In other implementations, additional operations may be performed along with some or all of the operations shown in FIG. 2. In yet other implementations, one or more operations may be performed simultaneously. In yet other implementations, one or more operations may not be performed. Accordingly, the operations described are exemplary in nature and, as such, should not be viewed as limiting.

In operation 202, a request to visualize system resource relationships may be received by system state manager 122a, 122*b*, and/or 122*c*, for example. The request may be a user request (or other system/dynamic request). The request may include one or more parameters, such as, group system name, list of database tables, one or more system resources, for which resource relationships are to be visualized, or may not include parameters.

In operation 204, a determination may be made regarding whether a composite table or a global resource table is to be queried, based on the request. In one implementation, the determination may be made based on the group system name where the group system name may identify the sub-systems from which information is to be retrieved. For example, if a group system name identifying all sub-systems in the mainframe management system is included in the request, a determination may be made that a global resource table is to be queried. However, if the group system name identifies a sub-group of sub-systems, a determination may be made that a composite table is to be queried. In one implementation, the determination may be made based on a particular system resource included in the request. For example, if a system resource is included in the request, a determination may be made that a composite table is to be queried. In one implementation, if no parameters are included in the request, a determination may be made that the global resource table is to be queried.

In one implementation, in response to a determination that a composite table is to be queried, a composite table may be generated in operation 208. In one implementation, database tables from the appropriate sub-systems (identified per the request, for example) may be retrieved and combined to generate the composite table. In one implementation, system resource relationship information associated with the sub-systems and/or system resources (identified per the request, for example) may be retrieved from the database tables (identified per the request, for example) associated with the sub-systems and may be combined to generate the composite table.

In one implementation, in response to a determination that a global resource table is to be queried, the global resource table may be extracted from global resource database in operation 206. In one implementation, system resource relationship information associated with all the sub-systems in the mainframe environment may be retrieved from the global resource table.

In operation 210, a DOT file may be generated that describes the structure of the created/extracted table. The DOT file may describe the system resources and the relationships between the resources (i.e. system resource relationship information retrieved from composite table and/or global resource table). In some implementations, CreateGraphScript function may be implemented in REXX language. The CreateGraphScript function may take the contents of the composite/global resource table (retrieved via SQL statements, for example) and translate the contents into compliant DOT file text. The function may process each record in the tables independently, translating the record into its textual DOT file representation. Once the function has created a complete representation of the final DOT file in primary memory, this data may be transferred into a dataset (a file in distributed terminology) so that it can be communicated via FTP protocol.

In operation 212, the generated DOT file may be transferred from system A, B, and/or C/mainframe management sub-system 142, 144, and/or 146 to PC 150 or any desktop or other computer that is configured to run graph visualization software that is capable of processing the DOT file and displaying graphical representation(s) of the created/extracted table.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for facilitating graphical visualization of system resource relationships in a text-based mainframe environment, the method executed by one or more processors of a text-based mainframe management system configured to perform a plurality of operations, the operations comprising:

receiving, by the text-based mainframe management system, a request to visualize one or more system resource relationships;

retrieving, by the text-based mainframe management system, system resource relationship information from a database table associated with one or more sub-systems in the text-based mainframe environment, wherein the system resource relationship information includes information describing at least one system resource relationship between one or more system resources associated with the one or more sub-systems;

generating, by the text-based mainframe management system, a text file in a graph description language based on the retrieved system resource relationship information, wherein the text file includes one or more instructions used to generate a graphical representation of the system resource relationship information for the one or more system resources; and communicating, by the text-based mainframe management system, the generated text file to a remote computer separate from the text-based mainframe management system, thereby facilitating the graphical representation at the remote computer, wherein the text-based mainframe environment comprises an environment where the graphical representation of the system resource relationship information is not used.

2. The computer-implemented method of claim 1, wherein the database table is a composite table or a global resource table, the operations further comprising:

determining whether the composite table or the global resource table is to be queried based on the request;

generating the composite table in response to a determination that the composite table is to be queried, wherein said retrieved information is retrieved from the composite table; and extracting the global resource table from a global resource database in response to a determination that the global resource table is to be queried, wherein said retrieved information is retrieved from the global resource table, and wherein the global resource table comprises system resource relationship information associated with each of the one or more sub-systems in the text-based mainframe environment.

3. The computer-implemented method of claim 2, wherein the request identifies a system resource, and wherein said determining further comprising:

determining that the composite table is to be queried in response to a determination that the request identifies the system resource, wherein said generating the composite table further comprises:

retrieving, from a database associated with each sub-system in the text-mainframe environment, system resource relationship information associated with the system resource identified in the request, and generating the composite table wherein the composite table includes the retrieved system resource relationship information associated with the system resource.

4. The computer-implemented method of claim 2, wherein the request identifies at least two sub-systems in the text-based mainframe environment, and wherein said determining further comprising:

determining that the composite table is to be queried in response to a determination that the request identifies the at least two sub-systems, wherein said generating the composite table further comprises:

retrieving, from a database associated with each of the at least two sub-systems in the text-based mainframe environment, system resource relationship information associated with the at least two-sub-systems identified in the request, and generating the composite table, wherein the composite table includes system resource relationship information associated with the at least two sub-systems.

5. The computer-implemented method of claim 1, wherein the graph description language is DOT language.

6. The computer-implemented method of claim 1, wherein said communicating includes a file transfer protocol communication.

7. A tangible computer-readable storage medium having one or more computer-readable instructions thereon which when executed by one or more processors of a text-based mainframe management system cause the one or more processors to:

receive, by the text-based mainframe management system, a request to visualize one or more system resource relationships;

retrieve, by the text-based mainframe management system, system resource relationship information from a database table associated with one or more sub-systems in the text-based mainframe environment, wherein the system resource relationship information includes information describing at least one system resource relationship between one or more system resources associated with the one or more sub-systems;

generate, by the text-based mainframe management system, a text file in a graph description language based on the retrieved system resource relationship information, wherein the text file includes one or more instructions used to generate a graphical representation of the system resource relationship information for the one or more system resources; and communicate, by the text-based mainframe management system the generated text file to a remote computer separate from the text-based mainframe management system, thereby facilitating the graphical representation at the remote computer, wherein the text-based mainframe environment comprises an environment where the graphical representation of the system resource relationship information is not used.

8. The tangible computer-readable storage medium of claim 7, wherein the database table is a composite table or a global resource table, and wherein the one or more instructions further cause the one or more processors to:

determine whether the composite table or the global resource table is to be queried based on the request;

generate the composite table in response to a determination that the composite table is to be queried, wherein said retrieved information is retrieved from the composite table; and extract the global resource table from a global resource database in response to a determination that the global resource table is to be queried, wherein said retrieved information is retrieved from the global resource table, and wherein the global resource table comprises system resource relationship information associated with each of the one or more sub-systems in the text-based mainframe environment.

9. The tangible computer-readable storage medium of claim 8, wherein the request identifies a system resource, and wherein the one or more computer-readable instructions causing the one or more processors to determine whether the composite table or global resource table is to be queried further include instructions causing the one or more processors to:

determine that the composite table is to be queried in response to a determination that the request identifies the system resource, wherein the instructions causing the processors to generate the composite table further include instructions causing the processors to:

retrieve, from a database associated with each sub-system in the text-mainframe environment, system resource relationship information associated with the system resource identified in the request, and generate the composite table, wherein the composite table includes the retrieved system resource relationship information associated with the system resource.

10. The tangible computer-readable storage medium of claim 8, wherein the request identifies at least two sub-systems in the text-based mainframe environment, and wherein the one or more computer-readable instructions causing the one or more processors to determine whether the composite table or global resource table is to be queried further include instructions causing the one or more processors to:

determine that the composite table is to be queried in response to a determination that the request identifies the at least two sub-systems, wherein the instructions causing the processors to generate the composite table further include instructions causing the processors to:

retrieve, from a database associated with each of the at least two sub-systems in the text-based mainframe environment, system resource relationship information associated with the at least two-sub-systems identified in the request, and generate the composite table, wherein the composite table includes system resource relationship information associated with the at least two sub-systems.

11. The tangible computer-readable storage medium of claim 7, wherein the graph description language is DOT language.

12. The tangible computer-readable storage medium of claim 7, wherein the one or more computer-readable instructions causing the one or more processors to communicate further include instructions causing the one or more processors to:

communicate the generated text file to a remote computer via a file transfer protocol communication.

13. A computer-implemented system for facilitating graphical visualization of system resource relationships in a text-based mainframe environment, the system comprising:

one or more processors of a text-based mainframe management system configured to:

receive a request to visualize one or more system resource relationships;

retrieve system resource relationship information from a database table associated with one or more sub-systems in the text-based mainframe environment, wherein the system resource relationship information includes information describing at least one system resource relationship between one or more system resources associated with the one or more sub-systems;

generate a text file in a graph description language based on the retrieved system resource relationship information, wherein the text file includes one or more instructions used to generate a graphical representation of the system resource relationship information for the one or more system resources; and communicate the generated text file to a remote computer separate from the text-based mainframe management system, thereby facilitating the graphical representation at the remote computer, wherein the text-based mainframe environment comprises an environment where the graphical representation of the system resource relationship information is not used.

14. The computer-implemented system of claim 13, wherein the one or more processors are further configured to:

determine whether the composite table or the global resource table is to be queried based on the request;

generate the composite table in response to a determination that the composite table is to be queried, wherein said retrieved information is retrieved from the composite table; and extract the global resource table from a global resource database in response to a determination that the global resource table is to be queried, wherein said retrieved information is retrieved from the global resource table, and wherein the global resource table comprises system resource relationship information associated with each of the one or more sub-systems in the text-based mainframe environment.

15. The computer-implemented system of claim 14, wherein the request identifies a system resource, and wherein the one or more processors configured to determine whether the composite table or global resource table is to be queried further comprise one or more processors configured to:

determine that the composite table is to be queried in response to a determination that the request identifies the system resource, wherein the processors configured to generate the composite table are further configured to:

retrieve, from a database associated with each sub-system in the text-mainframe environment, system resource relationship information associated with the system resource identified in the request, and generate the composite table, wherein the composite table includes the retrieved system resource relationship information associated with the system resource.

16. The computer-implemented system of claim 14, wherein the request identifies at least two sub-systems in the text-based mainframe environment, and wherein the one or more processors configured to determine whether the composite table or global resource table is to be queried further comprise one or more processors configured to:

determine that the composite table is to be queried in response to a determination that the request identifies the at least two sub-systems, wherein the processors configured to generate the composite table are further configured to:

retrieve, from a database associated with each of the at least two sub-systems in the text-based mainframe environment, system resource relationship information associated with the at least two-sub-systems identified in the request, and generate the composite table, wherein the composite table includes system resource relationship information associated with the at least two sub-systems.

17. The computer-implemented system of claim 13, wherein the graph description language is DOT language.

18. The computer-implemented system of claim 13, wherein the one or more processors configured to communicate further comprise one or more processors configured to:

communicate the generated text file to a remote computer via a file transfer protocol communication.

* * * * *

UNITED STATES PATENT AND TRADEMARK OFFICE
CERTIFICATE OF CORRECTION

| | | |
|---|---|---|
| PATENT NO. | : 8,819,082 B2 | |
| APPLICATION NO. | : 12/786604 | |
| DATED | : August 26, 2014 | |
| INVENTOR(S) | : M. Supak et al. | |

It is certified that error appears in the above-identified patent and that said Letters Patent is hereby corrected as shown below:

In the Claims,

Column 9, (claim 3, line 25), please add a "," after "table".

Signed and Sealed this
Twenty-sixth Day of May, 2015

Michelle K. Lee
*Director of the United States Patent and Trademark Office*